US008500171B2

(12) United States Patent
Tadlock et al.

(10) Patent No.: US 8,500,171 B2
(45) Date of Patent: Aug. 6, 2013

(54) FLUID DISTRIBUTOR AND COLLECTION DEVICE WITH COLLAPSIBLE LATERALS AND KNUCKLES

(75) Inventors: John W. Tadlock, West Chicago, IL (US); Christopher J. Hanish, Waukesha, WI (US); Thomas Wilcox, Waterford, WI (US)

(73) Assignee: John Tadlock & Associates, Inc., West Chicago, IL (US)

( * ) Notice: Subject to any disclaimer, the term of this patent is extended or adjusted under 35 U.S.C. 154(b) by 384 days.

(21) Appl. No.: 12/689,795

(22) Filed: Jan. 19, 2010

(65) Prior Publication Data

US 2010/0229982 A1 Sep. 16, 2010

Related U.S. Application Data

(60) Provisional application No. 61/209,816, filed on Mar. 11, 2009.

(51) Int. Cl.
*F16L 39/00* (2006.01)

(52) U.S. Cl.
USPC .......................................... 285/125.1; 405/43

(58) Field of Classification Search
USPC ............... 285/184, 121.3, 283, 128.3, 128.1, 285/126.1, 121.2, 121.1, 125.1; 137/615; 405/43, 48
See application file for complete search history.

(56) References Cited

U.S. PATENT DOCUMENTS

| | | | | |
|---|---|---|---|---|
| 1,737,557 A | * | 12/1929 | Beach | 165/130 |
| 2,082,403 A | * | 6/1937 | Larkin | 138/37 |
| 2,732,228 A | * | 1/1956 | Armstrong | 285/184 |
| 2,768,750 A | | 10/1956 | Kryzer | |
| 3,006,478 A | | 10/1961 | Mueller | |
| 3,625,365 A | | 12/1971 | Armstrong et al. | |
| 3,704,785 A | | 12/1972 | Marsh | |
| 3,747,768 A | | 7/1973 | Barrera | |
| 4,134,268 A | * | 1/1979 | Elmore | 405/43 |
| 4,158,462 A | * | 6/1979 | Coral | 285/144.1 |
| 4,169,793 A | | 10/1979 | Lockshaw | |
| 4,478,716 A | | 10/1984 | Hasegawa et al. | |
| 4,753,726 A | | 6/1988 | Suchanek | |
| 4,890,864 A | * | 1/1990 | Anderson et al. | 285/126.1 |
| 5,046,764 A | * | 9/1991 | Kimura et al. | 285/154.2 |
| 5,054,818 A | * | 10/1991 | Briet | 285/124.5 |
| 5,066,393 A | | 11/1991 | Padera et al. | |
| 5,068,033 A | | 11/1991 | Tobias et al. | |
| 5,149,227 A | * | 9/1992 | Parks | 405/73 |
| 5,215,338 A | * | 6/1993 | Kimura et al. | 285/154.2 |
| 5,836,716 A | * | 11/1998 | Johnson et al. | 405/43 |
| 6,058,968 A | | 5/2000 | Carter | |
| 6,059,967 A | | 5/2000 | Field | |

(Continued)

OTHER PUBLICATIONS

Residential Distributors, Clark Corporation (www.clarkcorp.com); Form No. 1922C—Updated May 2, 2006.

(Continued)

*Primary Examiner* — Aaron Dunwoody

(74) *Attorney, Agent, or Firm* — Husch Blackwell LLP

(57) ABSTRACT

A lateral for use in connection with a fluid distributor and collection device is provided. The lateral includes an elongated tubular conduit having a first end and a second end, a plurality of slots disposed along at least a portion of the conduit, and a connecting mechanism disposed proximate to the second end. Each of the slots is angled relative to the conduit to redirect a flow of fluid exiting the conduit.

19 Claims, 6 Drawing Sheets

U.S. PATENT DOCUMENTS

| | | | |
|---|---|---|---|
| 6,223,777 B1 * | 5/2001 | Smith et al. | 138/109 |
| 6,283,510 B1 * | 9/2001 | Bartholoma et al. | 285/184 |
| 6,447,675 B1 | 9/2002 | James | |
| 6,685,826 B1 | 2/2004 | James | |
| 6,709,574 B2 | 3/2004 | James | |
| 7,066,411 B2 * | 6/2006 | Male et al. | 239/587.1 |
| 7,422,478 B2 * | 9/2008 | Zugel et al. | 439/582 |
| 7,422,492 B2 * | 9/2008 | Zugel et al. | 439/855 |
| 7,677,271 B2 * | 3/2010 | Boettner et al. | 138/119 |
| 2012/0068452 A1 * | 3/2012 | Boettner | 285/45 |

OTHER PUBLICATIONS

Bajonet™ Distribution Systems product sheet, undated.

* cited by examiner

FLUID DISTRIBUTOR AND COLLECTION DEVICE WITH COLLAPSIBLE LATERALS AND KNUCKLES

CROSS-REFERENCE TO RELATED APPLICATIONS

This application claims priority to U.S. Provisional Patent Application No. 61/209,816 filed Mar. 11, 2009 titled "Fluid Distribution and Collection Device With Collapsible Hub and Laterals."

FIELD OF THE INVENTION

The present invention relates generally to fluid distribution systems and more particularly to a fluid distributor and collection device with collapsible laterals and knuckles used in fluid treatment systems.

BACKGROUND OF THE INVENTION

Fluid distribution systems can include a fluid tank, a valve mounted in the opening of the fluid tank, a return pipe or line, and a fluid distributor and collection device. A first end of the return pipe can be connected to the valve, and a second end of the return pipe can be connected to the fluid distributor and collection device located inside the tank. In addition to a fluid, the tank can include a filter media, such as sand.

The fluid distributor and collection device can filter liquid in the tank during operation of the fluid distribution system. In many fluid distribution systems, the fluid distributor and collection device includes a hub and plurality of laterals radially connected thereto. For example, slits in the plurality of laterals can receive fluid in the tank and direct the fluid towards a plurality of openings that can transfer the fluid into the hub. From the hub, the fluid can be directed up the return pipe and out of the fluid tank. Thus, the fluid is filtered by the filter media in the tank, and the media is retained by the fluid distributor and collection device.

In many fluid tanks used by those of skill in the art, the tank opening is restricted. For example, the tank opening can have a diameter as small as between four and four and a half inches. Accordingly, the fluid distributor and collection device, including the hub and plurality of laterals, generally cannot be inserted into the fluid tank fully assembled. The diameter of the assembled fluid distributor and collection device is too large to fit through the fluid tank opening.

Accordingly, in many common fluid tanks, the return pipe is inserted into the fluid tank as assembled only to the hub. Once the hub is inserted and placed in the tank, the laterals must be manually and individually connected to the hub. However, depending on the size of the tank opening, the hands of the individual who connects the laterals to the hub must also be small. Further, often a special tool or apparatus is required to securely and precisely connect the laterals to the hub once inside the tank.

There is thus a continuing, ongoing need for an improved fluid distributor and collection device that can be used in connection with known fluid distribution systems and fluid treatment tanks. Preferably, an improved fluid distributor and collection device can be placed inside of a fluid treatment tank as assembled.

SUMMARY OF THE INVENTION

According to the present invention, a lateral for use in connection with a fluid distributor and collection device is provided. The lateral can include an elongated tubular conduit having a first end and a second end, a plurality of slots disposed along at least a portion of the conduit, and a connecting mechanism disposed proximate to at least one end. Each of the slots can be angled relative to the conduit to redirect a flow of fluid exiting the conduit.

In embodiments of the present invention, a first opening can be disposed at the first end of the lateral and a second opening can be disposed at the second end of the lateral. A plug can be disposed in the first opening or a second lateral may be connected to the lateral at the first opening.

The conduit can be in fluid communication with the second opening, and the plurality of slots can be in fluid communication with the conduit.

Each of the slots can be of particular size, and a screen can be included over or under each of the slots. In embodiments of the present invention, the plurality of slots can be disposed along substantially the entire portion of the conduit. At least some of the slots can be disposed at an approximate 45 degree angle relative to the conduit.

The connecting mechanism of the lateral can include at least one protrusion extending from an exterior of the conduit for being received by a corresponding recess of the fluid distributor and collection device. At least portions of the lateral can be made of plastic, and at least portions of the lateral can be injection molded.

A fluid distributor and collection device is also provided having a hub and a plurality of elongated rigid laterals having a first opening at a first end thereof and a second opening at a second end therein. Each of the laterals can include a plurality of slots disposed along at least a portion of the lateral. Further, each of the laterals can be rotated via an associated knuckle and relative to the hub to move each of knuckle and lateral combination from a loading position, in which each of the laterals extends in a downward direction away from the hub, to a fluid communication position where each of the knuckles and laterals are in fluid communication with the hub.

Each lateral can include a first connecting mechanism for lockingly connecting the conduit to the associated knuckle. The knuckle can include a second connecting mechanism for pivotally connecting to the hub and moving the knuckle and lateral from the loading position to the fluid communication position.

The plurality of slots of each conduit can be in fluid communication with the hub when the conduit is in the fluid communication position. Each of the slots can be of a width commensurate with the media particle size of concern, and the plurality of slots can be disposed along substantially the entire portion of the lateral. At least some of the slots can be disposed at an approximate 45 degree angle relative to the lateral center line.

A fluid distributor and collection device is also provided. The device can include a cylindrical wall defining a central chamber, a plurality of connectors disposed on the exterior of the cylindrical wall, a plurality of first elongated rigid laterals, and a plurality of second elongated rigid laterals. The cylindrical wall can include a plurality of radially spaced openings disposed therein, and each connector can be associated with a respective opening disposed in the cylindrical wall.

Each of the first elongated rigid laterals can have a first opening at a first end thereof and a second opening at a second end thereof. Each of the second elongated rigid laterals can have a first opening at a first end thereof, a second opening at a second end thereof, and a plurality of slots disposed along at least a portion of the second elongated rigid lateral.

Each of the first elongated rigid laterals can be rotatably connected to a respective knuckle to move the first elongated rigid lateral from a loading position to a fluid communication position. In the loading position, each of the first elongated rigid laterals extends in a downward direction away from the cylindrical wall. In the fluid communication position, a respective knuckle mates with the first elongated rigid lateral, and the first elongated rigid lateral is in fluid communication with the respective connector.

Each of the second elongated rigid laterals can be lockingly connected to a respective first elongated rigid lateral. Each of the second elongated rigid laterals can be in fluid communication with a respective first elongated rigid lateral when the first elongated rigid lateral is in both the loading position and in the fluid communication position. The plurality of slots can be in fluid communication with the respective second elongated rigid lateral.

In accordance with the above, it is a benefit of the present invention to provide an improved fluid distributor and collection device that can be used in connection with known fluid distribution systems and fluid treatment tanks.

It is a further benefit of the present invention to provide an improved fluid distributor and collection device that can be placed inside of a fluid treatment tank as assembled.

Finally, it is a benefit of the present invention to provide a hub and a plurality of laterals for use in a fluid distribution system.

In accordance with the present invention, all of these benefits as well as others not herein specifically identified are generally achieved by the present fluid distributor and collection device.

BRIEF DESCRIPTION OF THE DRAWINGS

Various examples of objects, features and attendant advantages of the present invention will become fully appreciated as the same becomes better understood when considered in conjunction with the accompanying drawings, wherein.

DETAILED DESCRIPTION OF THE INVENTION

Figure 1:
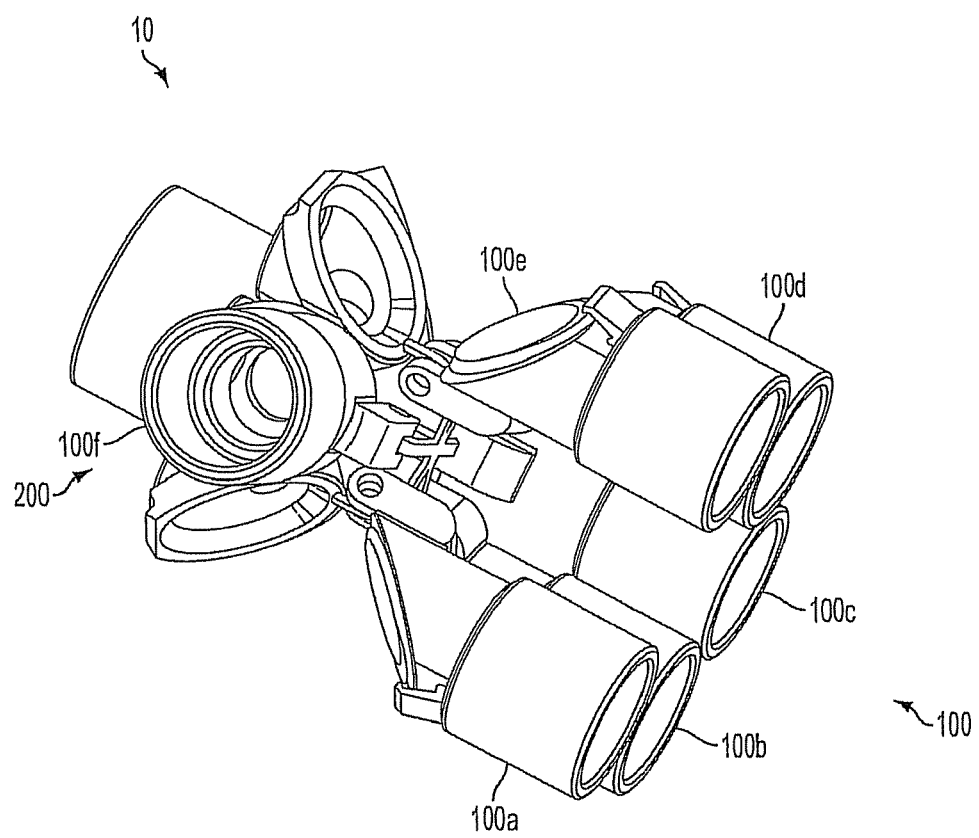
FIG. 1 is a perspective view of a fluid distributor and collection device in accordance with the present invention.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include an improved fluid distributor and collection device that can be used in connection with known fluid distribution systems and fluid treatment tanks. Preferably, the fluid distributor and collection device in accordance with the present invention can be placed inside of a fluid treatment tank as assembled.

The fluid distributor and collection device according to the present invention can be made of plastic or any other material known in the art that is compatible with treated fluid. The device can be injection molded.

Further, the fluid distributor and collection device according to the present invention can be any size that would be desirable by one of skill in the art. The device can be used in commercial, industrial, or residential fluid treatment systems or in connection with swimming pool treatment systems. Accordingly, the device and its components can be of a size that would be suitable for the intended usage.

The fluid distributor and collection device in accordance with the present invention can include a hub, a plurality of knuckles that can be radially connected thereto, and a plurality of laterals that can be connected to respective knuckles. The hub can be rigid and include connecting and locking mechanisms to mate with corresponding first connecting and locking mechanisms of the knuckles. The knuckles can also be rigid and include second connecting and locking mechanisms to mate with corresponding connecting and locking mechanisms of the laterals.

In embodiments of the present invention, the hub can include a cylindrical wall that defines a central chamber. The top end of the cylindrical wall can define a top opening of the central chamber, and a plurality of radially spaced apart side openings can be disposed in the wall. The cylindrical wall can also include a plurality of connectors disposed on the exterior of the wall such that each connector is associated with a respective side opening. A plurality of connecting mechanisms can be disposed below the cylindrical wall such that each connecting mechanism is associated with a respective connector.

Distal ends of each of the connectors can be angled so that the connector extends inwards from a top end thereof to a bottom end thereof. The top distal end of each connector can extend away from the cylindrical wall farther than the bottom distal end of the connector extends away from the cylindrical wall. The distal end of each connector can include a beveled, angled surface that defines an opening leading to a respective side opening of the cylindrical wall.

Knuckles can be connected to the hub via first connecting mechanisms, and knuckles can be connected to respective laterals via second connecting mechanisms. In operation, fluid can pass from the laterals, to the knuckles, through the connectors and radially spaced side openings, and into the central chamber. Once in the central chamber, fluid can be directed out of the tank via a riser pipe.

The knuckles can be elongated, tubular, rigid conduits for receiving fluid from the laterals. Each knuckle can have a first opening at a first end and a second opening at a second end. A connecting mechanism proximate to the first opening can mate with a corresponding connecting mechanism of a lateral for connecting thereto. A connecting mechanism proximate to the second end of the knuckle can rotatably connect to the hub, and a locking mechanism proximate to the second end of the knuckle can fixedly lock the knuckle in place relative to the hub.

The second end of the knuckle can be angled so that the second opening angles inward from a distal end thereof to a middle portion of the knuckle. The second end can include a beveled, angled surface that defines the second opening. The beveled, angled surface of the second end of the knuckle can mate with the beveled, angled surface of a hub connector.

The laterals can be elongated, tubular rigid conduits for receiving fluid from the tank. Each lateral can have a first opening at a first end and a second opening at a second end. A plug can be inserted into the first opening of the lateral. A connecting mechanism proximate to the second end of the lateral can mate with the corresponding connecting mechanism of the knuckle for connecting thereto.

Laterals in accordance with the present invention can include a plurality of openings, slots, or slits along at least a portion of the length of the conduit for receiving fluid in the fluid tank. In some embodiments of the present invention, the openings along the length of the lateral can be angled so that an efficient backwash is created when the fluid distribution system is in operation. Fluid can be spewed from the lateral outwardly at various angles to redirect the flow of the fluid.

The openings along the length of the lateral can be tapered and can be of particle size so that a filter media is prevented from entering the lateral. Accordingly, the openings along the length of the laterals can function as a sealing mechanism. In some embodiments, the laterals can include a screen for receiving fluid in the tank.

When inserting the fluid distributor and collection device into a fluid tank, the device can be in a loading position. That is, the knuckles can be connected to the hub, the laterals can be connected to the knuckles, and the lateral-knuckle combinations can be pivoted via the rotatable connecting mechanisms so that the knuckles and laterals extend in a downward direction relative to the hub. When the device is in the loading position, the device is assembled and yet the diameter of the device is minimized. Further, when the device is in the loading position, the laterals and the knuckles can be in fluid communication with one another, but the knuckles are not in fluid communication with the hub.

Once inside of the tank, the device can be moved to the fluid distribution position. That is, the knuckle-lateral combinations can be rotated upward via the rotatable connecting mechanisms so that the locking mechanisms engage the hub and the knuckles are locked into fluid communication with the hub. In the fluid communication position, the angled, beveled surface of a knuckle engages and mates with the angled, beveled surface of a hub connector.

In accordance with the present invention, the knuckles and laterals can have any length as would be known and desired by those of ordinary skill in the art. In some embodiments, the knuckles, laterals, or the knuckle-lateral combinations can have a length of up to one half the diameter of the fluid tank in which the laterals and knuckles are located.

FIG. 1 is a perspective view of a fluid distributor and collection device 10 in accordance with the present invention. As seen in FIG. 1, the fluid distributor and collection device 10 can include a hub 200 and a plurality of knuckles 100 radially and rotatably connected thereto. Although not shown in FIG. 1, a plurality of laterals can be connected to the respective ones of the plurality of knuckles 100. The hub 200, plurality of knuckles 100, and plurality of laterals will be described in more detail herein.

The fluid distributor and collection device 10 shown in FIG. 1 includes six laterals 100a, 100b, 100c, 100d, 100e, 100f connected to the hub 200. However, the fluid distributor and collection device 10 in accordance with the present invention is not limited to six laterals. Instead, the device 10 can include more or less than six laterals as would be known and desired in the art. The fluid distributor and collection device 10 can include the same number of laterals as knuckles.

As seen in FIG. 1, the device 10 is in the loading position, with the knuckles directed down and away from the hub, to minimize the diameter of the device 10. That is, except for knuckle 100f, each plurality of knuckles 100 is pivoted so that it extends in a downward direction relative to the hub 200. The orientation of the knuckles 100 relative to the hub 200 in the loading position is desired for placing the device 10 through the opening of a fluid treatment tank.

Figure 2:
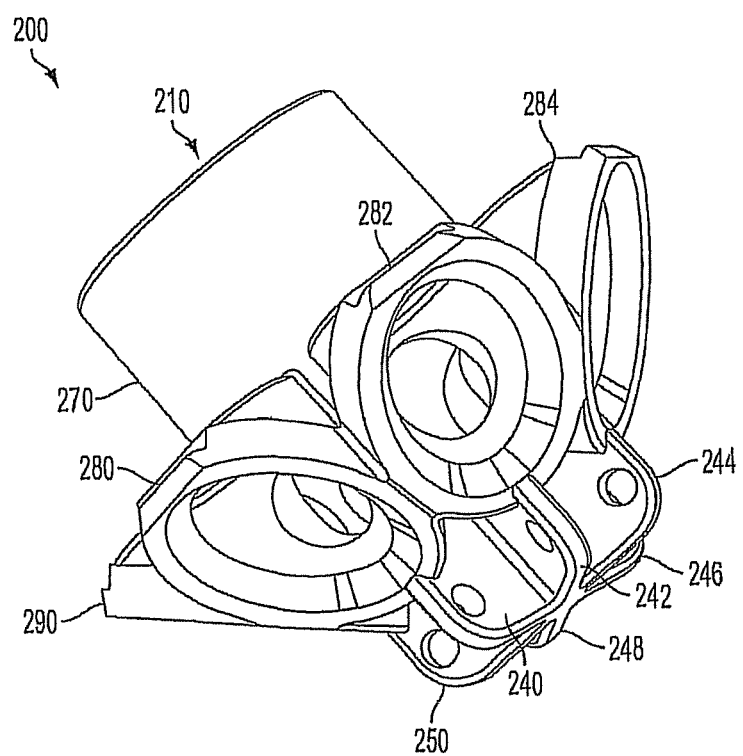
FIG. 2 is a perspective view of the hub of the fluid distributor and collection device of FIG. 1 in accordance with the present invention.

FIG. 2 is a perspective view of the hub 200 of the fluid distributor and collection device 10 in accordance with the present invention. As seen in FIG. 2, the hub 200 can include a cylindrical wall 270. A top end of the cylindrical wall 270 can define a top opening 210 of the hub 200. The cylindrical wall 270 can also include a plurality of radially spaced apart side circular openings that are in fluid communication with the top opening 210 via a central chamber (not shown).

A plurality of extension connectors 280, 282, 284, 286, 288, 290 can be radially disposed on the exterior of the cylindrical wall so that each connector 280, 282, 284, 286, 288, 290 is associated with a side opening. Each connector 280, 282, 284, 286, 288, 290 can include an angled distal end such that a top distal end extends farther away from the cylindrical wall 270 than a bottom distal end.

The distal end of each connector 280, 282, 284, 286, 288, 290 can include a beveled, angled surface that defines an opening in the connector leading to the associated side opening of the cylindrical wall 270. The beveled, angled surface can be suitable for mating with a corresponding surface of a knuckle. The hub 200 shown in FIG. 2 includes six connectors. However, the hub 200 can include more or less than six connectors as would be known and desired in the art.

Connecting mechanisms 240, 242, 244, 246, 248, 250 are disposed below the cylindrical wall such that each connecting mechanism 240, 242, 244, 246, 248, 250 corresponds to a connector 280, 282, 284, 286, 288, 290, respectively. For example, each connecting mechanism 240, 242, 244, 246, 248, 250 can be located below the respective connector 280, 282, 284, 286, 288, 290 and mate with a corresponding connecting mechanism of a knuckle. In embodiments of the present invention, the connecting mechanisms 240, 242, 244, 246, 248, 250 can include, for example, a hinge pin or hole, or a ball or socket.

Figure 3:
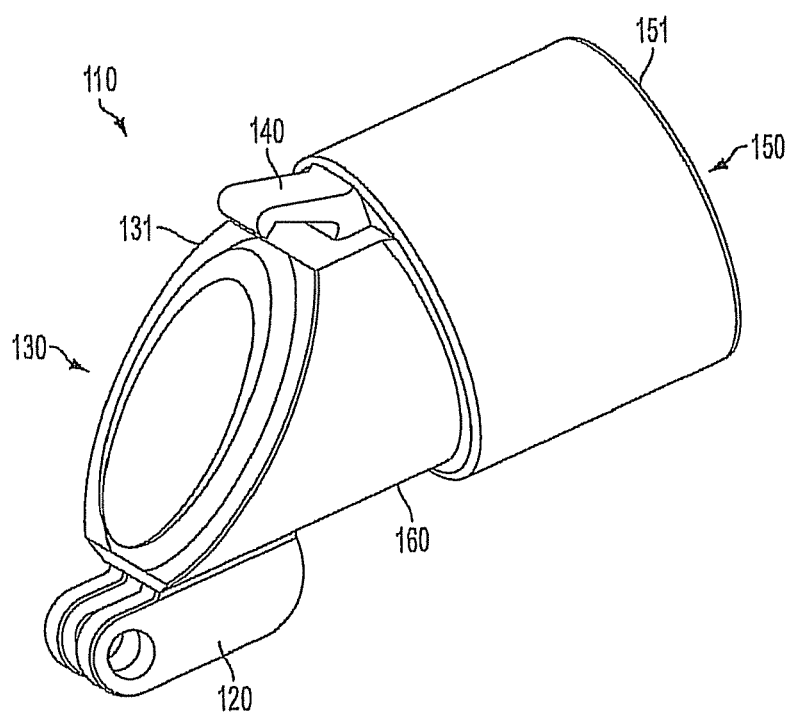
FIG. 3 is a perspective view of the knuckle of the fluid distributor and collection device of FIG. 1 in accordance with the present invention.

FIG. 3 is a perspective view of an articulated knuckle 110 of the fluid distributor and collection device 10 in accordance with the present invention. As seen in FIG. 3, the knuckle 110 can include a connecting mechanism 120, a locking mechanism 140a, a recess 170 (shown in FIG. 6), and an elongated tubular conduit 160 with a first opening 150 at a first end 151 thereof and a second opening 130 at a second end 131 thereof. The first opening 150 can be in fluid communication with the second opening 130 via the conduit 160 of the knuckle 110.

The second end 131 of the conduit 160 can angle from a distal end thereof to the middle of the conduit 160. Further, the second end 131 of the conduit 160 can include an angled, beveled surface that defines the second opening 130. The angled, beveled surface can be suitable for mating with a corresponding surface of a hub connector 280.

When the beveled surface of the knuckle 110 mates with the beveled surface of the hub 200, the second opening 130 of the knuckle can be in fluid communication with the hub connector 280 and its corresponding side opening in the cylindrical wall 270. Accordingly, the conduit 160 of the knuckle 110 is in fluid communication with the central chamber of the hub 200.

In embodiments of the present invention, when the beveled surface of the knuckle 110 mates with the beveled surface of the hub 200, a seal can be created to prevent filter media from entering either the knuckle 110, the hub 200 or the connection therebetween. Either one or both of the beveled surfaces can include a resilient material to create a positive seal.

The connecting mechanism 120 can be disposed at the distal second end 130 of the conduit 160 and can mate with a corresponding connecting mechanism, for example, 240, of the hub 200. In embodiments of the present invention, the connecting mechanism 120 is rotatable to allow the knuckle 110 to pivot relative to the hub 200. In embodiments of the present invention, the connecting mechanism 120 could be, for example, a hinge pin or hole, a ball or socket, or any other type of connecting mechanism as would be known and desired by those of skill in the art.

The locking mechanism 140 can be disposed on the interior of the conduit 160, on the angled, beveled surface of the conduit 160, or, as seen in FIG. 3, on the exterior of the conduit 160. The locking mechanism 140 can lockingly secure the knuckle 110 in place relative to the hub 200 when the knuckle 110 is rotated into a fluid communication position by mating with a corresponding locking mechanism of the hub 200. As seen in FIG. 3, the locking mechanism 140 is a hooked protrusion or locking hook for engaging an indented recess 260 of the hub 200. However, the locking mechanism could be any type of locking mechanism as would be known and desired by those of ordinary skill in the art.

Figure 10:
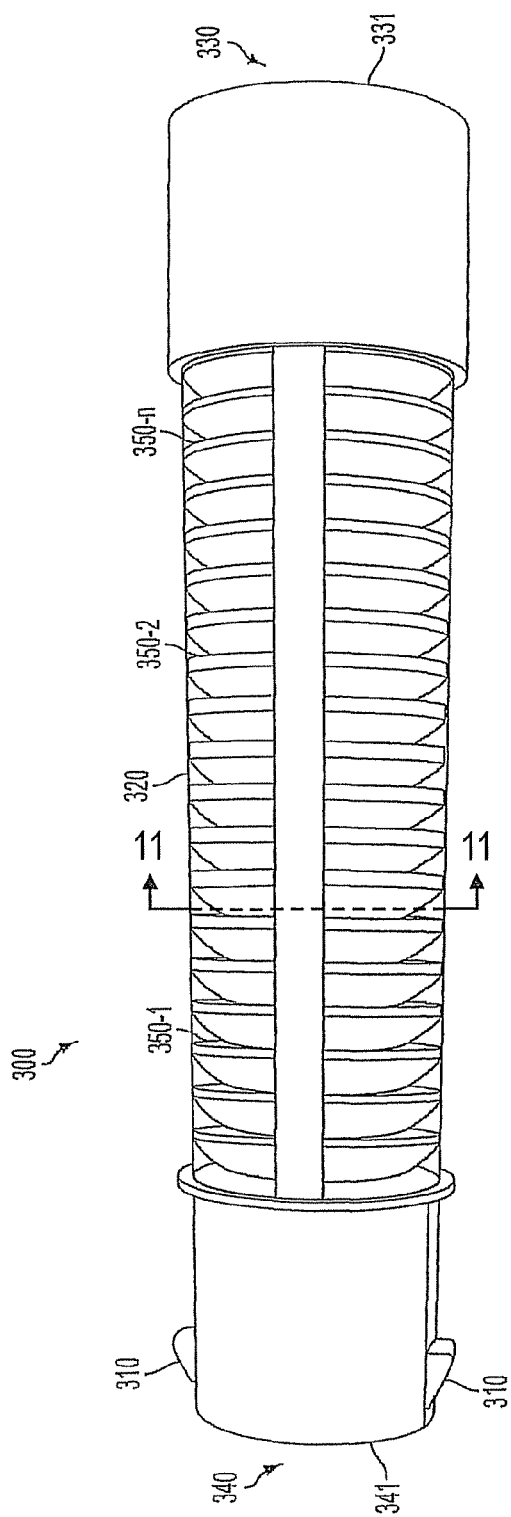
FIG. 10 is a side view of a lateral of a fluid distributor and collection device in accordance with the present invention.

FIG. 10 is a side view of a lateral 300 of the fluid distributor and collection device 10 in accordance with the present invention. As seen in FIG. 10, the lateral 300 can include a locking mechanism 310 and an elongated tubular conduit 320 with a first opening 330 at a first or outer end 331 thereof and a second opening 340 at a second or inner end 341 thereof. The first opening 330 can include a plug inserted therein to prevent fluid from entering or exiting the lateral 300 via the first opening 330.

A plurality of openings, slots, or slits 350-1, 350-2 . . . 350-*n* can be formed along at least a portion of the conduit 320. As seen in FIG. 10, each of the openings 350-*n* can be angled so that an efficient backwash is created when the fluid distribution system 10 is in operation.

Each of the openings 350-*n* can be of a particle size so that a filter media is prevented from entering the lateral 300. In embodiments of the present invention, each of the openings 350-*n* can be tapered and/or angled at between approximately 30 and 60 degrees relative to the conduit 320. Preferably, the openings 350-*n* are angled at between approximately 40 and 50 degrees, and most preferably the openings 350-*n* are angled at approximately 45 degrees relative to the conduit 320.

The openings 350-*n* can be from about 0.5 mm to about 1.5 mm wide. Preferably the openings are about 1.0 mm wide. In embodiments of the present invention, there can be from approximately 10 to approximately 30 openings 350-*n* along the conduit 320. Preferably, there can be from approximately 19 to approximately 20 openings 350-*n* along the conduit 320. However, the number of openings 350-*n* is not so limited.

Figure 11:
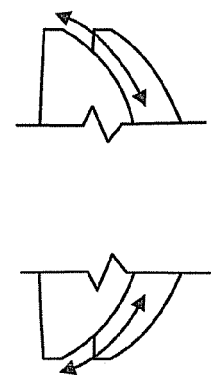
FIG. 11 is a cross section taken along the lines of 11-11 in FIG. 10.

Fluid can enter or exit the openings 350-1, 350-2 . . . 350-*n* of the lateral 300 to or from the conduit 320 as shown in FIG. 11. Thus, the openings 350-1, 350-2 . . . 350-*n* can be in fluid communication with the conduit.

A locking mechanism 310 can be located proximate to the second opening 340 of the conduit 320 and can mate with a corresponding locking mechanism 170 proximate to the first opening 150 of a knuckle 110. As seen in FIG. 10, the locking mechanism 310 includes at least first and second protrusions extending from the exterior of the conduit 320 that can be snap fit into corresponding recesses 170 of the knuckle conduit 160. However, the locking mechanism 310 can be any type of locking mechanism as would be known and desired by those of skill in the art.

In embodiments of the present invention, the locking mechanism 310 can secure the lateral 300 in place relative to the knuckle 110. Accordingly, in embodiments of the present invention, the lateral 300 is in fluid communication with the knuckle 110 when the device 10 is in the loading position and when the device 10 is in the fluid communication position 10. When the lateral 300 is lockingly secured to the knuckle 110, a seal can be created between the lateral 300 and the knuckle 110 to prevent filter media from entering the connection therebetween. Either one or both of the lateral 300 or knuckle 110 can include a resilient material to create a positive seal therebetween.

Figure 4:
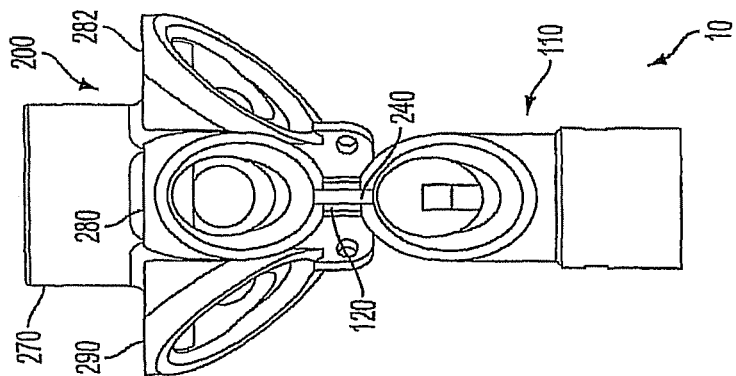
FIG. 4 is a front view of a fluid distributor and collection device showing one knuckle in a loading position in accordance with the present invention

FIG. 4 is a front view of a fluid distributor and collection device 10 in a loading position in accordance with the present invention. As seen in FIG. 4, the connection mechanism 120 of the knuckle 110 is rotated relative to the connection mechanism 240 of the hub 200 so that the knuckle 110 extends in a downward direction relative to the hub 200. When the device 10 is in the loading position, the device 10 can be placed through a restricted opening of a fluid tank. Although not shown in FIG. 4, a lateral 300 can be fixedly secured to the knuckle 110 when the device is in the loading position.

Figure 6:
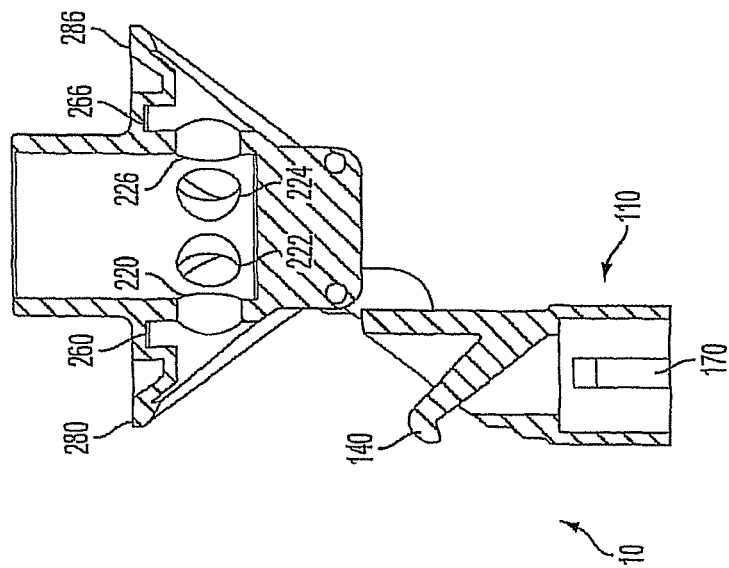
FIG. 6 is a cross-sectional view of a fluid distributor and collection device showing one knuckle in a loading position in accordance with the present invention.
Figure 5:
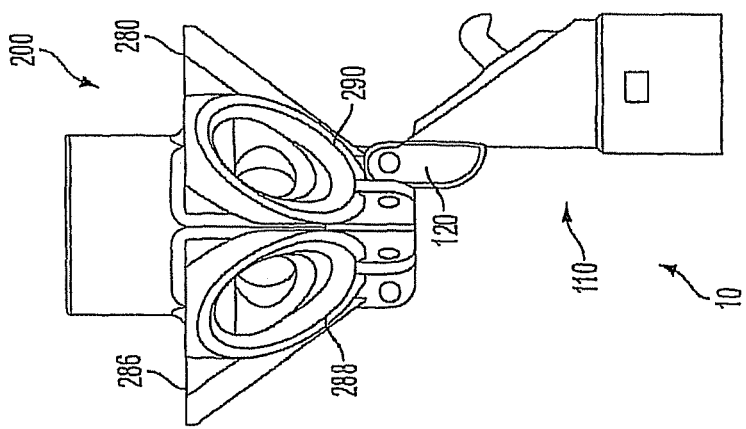
FIG. 5 is a side view of a fluid distributor and collection device showing one knuckle in a loading position in accordance with the present invention.

FIG. 5 is a side view of the device 10 in the loading position, and FIG. 6 is a cross sectional view of the device 10 in the loading position. As seen in FIG. 6, each of the radially spaced side openings such as 220, 222, 224, 226 is in fluid communication with its respective connector and the central chamber of the hub. Although not shown in FIG. 5 and FIG. 6, when the lateral 300 is fixedly secured to the knuckle 110, the lateral 300 is in fluid communication with the knuckle 110 in the loading position.

As further seen in FIG. 6, each connector can include a locking mechanism such as 260, for lockingly securing a knuckle 110 in place relative to the hub 200 when the knuckle 110 is rotated into a fluid communication position. For example, the locking mechanism 260 can include an indented recess for engaging a hooked protrusion of a locking mechanism 140*a* of the knuckle 110. However, the locking mechanism 260 could be any type of locking mechanism as would be known and desired by those of ordinary skill in the art. Additionally, each knuckle 110 can include a recess 170 for receiving the corresponding locking mechanism 310 of the lateral 300.

Figure 7:
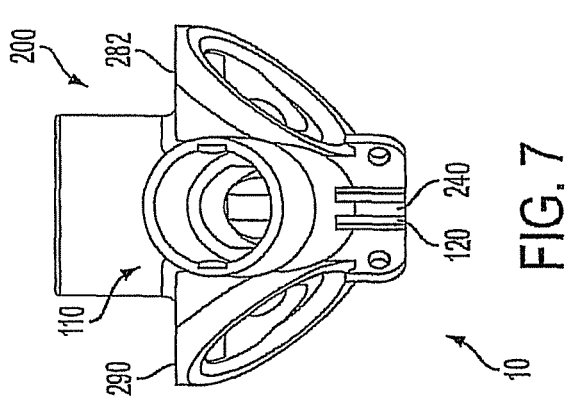
FIG. 7 is a front view of a fluid distributor and collection device showing one knuckle in a fluid communication position in accordance with the present invention.

FIG. 7 is a front view of the fluid distributor and collection device 10 in a fluid communication position in accordance with the present invention. As seen in FIG. 7, the connection mechanism 120 of the knuckle 110 is rotated relative to the connection mechanism 240 of the hub 200 so that the knuckle 110 is in fluid communication with the hub 200. Although not shown in FIG. 7, a lateral 300 can be fixedly secured to the knuckle 110 when the device is in the fluid communication position.

When the device 10 is in the fluid communication position, the angled, beveled surface of the knuckle 110 mates with the angled, beveled surface of the respective connector 280. Accordingly, the second opening 130 of the knuckle 110 is in fluid communication with the connector 280 and its respective side opening 220 of the hub 200. Additionally, when the device 10 is in the fluid communication position, the lateral 300 is in fluid communication with the knuckle 110.

Further, when the device 10 is in the fluid communication position, the locking mechanism 140 of the knuckle 110 is engaged with the locking mechanism 260 of the hub 200. The device 10 can be moved from the loading position to the fluid communication position after the device is placed through an opening of a fluid tank by rotating the knuckle 110 and lateral 300 about the connection mechanisms 120, 240 and relative to the hub 200. Additionally, when the device 10 is in the fluid communication position, the locking mechanism 310 of the lateral 300 is engaged with a corresponding locking mechanism of the knuckle 110.

Figure 9:
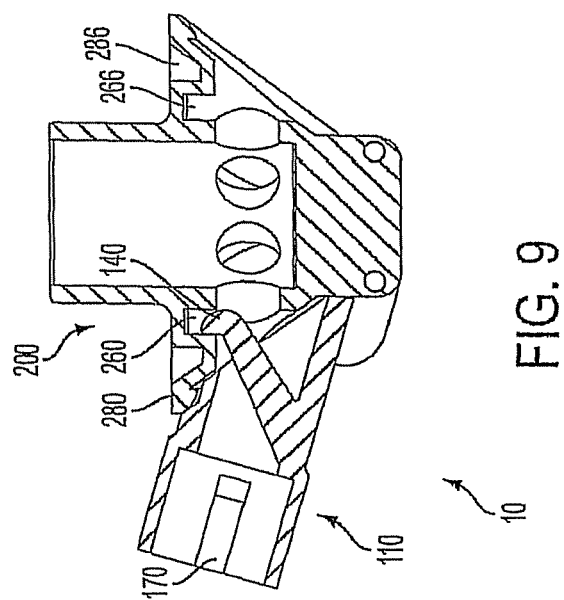
FIG. 9 is a cross-sectional view of a fluid distributor and collection device showing one knuckle in a fluid communication position in accordance with the present invention.
Figure 8:
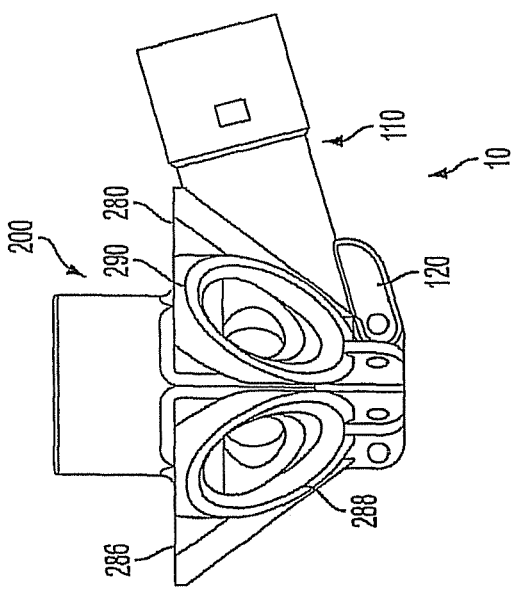
FIG. 8 is a side view of a fluid distributor and collection device showing one knuckle in a fluid communication position in accordance with the present invention.

FIG. 8 is a side view of the device 10 in the fluid communication position, and FIG. 9 is a cross-sectional view of the device 10 in the fluid communication position. As in FIG. 9, when the device 10 is in the fluid communication position, the knuckle 110 is in fluid communication with the hub 200. As also seen in FIG. 9, each knuckle 110 can include a recess 170 for receiving the corresponding locking mechanism 310 of the lateral 300.

From the foregoing, it will be observed that numerous variations and modifications may be effected without departing from the spirit and scope of the invention. It is to be understood that no limitation with respect to the specific apparatus or method illustrated herein is intended or should be inferred. It is, of course, intended to cover by the appended claims all such modifications as fall within the scope of the claims.

What is claimed:

1. A fluid distribution and collection device, comprising a conduit;
a hub;
said conduit being elongated with first end and a second end with and an opening at each of said first and second end;
said conduit being pivotally connected with said hub for movement from a loading position to an operative position;
a plurality of slit openings disposed along at least a portion of a wall of the conduit; to allow fluid entrance and fluid exit therethrough; and
a connecting mechanism disposed proximate to the second end, wherein each of the slit openings is angled 30° to 60° relative to the axis of the conduit to redirect a flow of fluid exiting or entering the conduit.

2. The lateral as in claim 1 including a first opening disposed at the first end and a second opening disposed at the second end.

3. The lateral as in claim 2 wherein the conduit is in fluid communication with the second opening.

4. The lateral as in claim 3 wherein the plurality of slit openings is in fluid communication with the conduit.

5. The lateral as in claim 1 wherein each of the slit openings is of particle size.

6. The lateral as in claim 1 including a screen over or under each of the slit openings.

7. The lateral as in claim 1 wherein the plurality of slit openings is disposed along substantially the entire portion of the conduit.

8. The lateral as in claim 1 wherein at least some of the slit openings are disposed at an approximate 45 degree angle relative to the conduit.

9. The lateral as in claim 1 wherein the connecting mechanism includes at least one protrusion extending from an exterior of the conduit for being received by a corresponding recess of the fluid distributor and collection device.

10. The lateral as in claim 1 wherein at least portions of the lateral are made of plastic.

11. The lateral as in claim 1 wherein at least portions of the lateral are injection molded.

12. A fluid distributor and collection device comprising:
a hub; and
a plurality of rigid laterals pivotally connected to the hub and having a first opening at a first end thereof and a second opening at a second end thereof, wherein each of the laterals includes a plurality of slit openings disposed along at least a portion of a wall of the lateral to allow fluid exit and entrance therethrough, and wherein each of the laterals is capable of being pivoted relative to the hub to move each of the laterals from a loading position in which each of the laterals extends in a downward direction away from the hub to a fluid communication position where each of the laterals is in fluid communication with the hub.

13. The fluid distributor and collection device as in claim 12 wherein the plurality of slit openings of each laterals is in fluid communication with the hub when the lateral is in the fluid communication position.

14. The fluid distributor and collection device as in claim 12 wherein each lateral includes a first connecting mechanism for lockingly connecting the lateral to a knuckle, and the knuckle includes a second connecting mechanism for rotatably connecting to the hub and moving the lateral from the loading position to the fluid communication position.

15. The fluid distributor and collection device as in claim 12 wherein each of the slit openings is of particle size.

16. The fluid distributor and collection device as in claim 12 wherein the plurality of slit openings is disposed along substantially the entire portion of the lateral.

17. The fluid distributor and collection device as in claim 12 wherein at least some of the slit openings are disposed at an approximate 45 degree angle relative to the lateral.

18. A fluid distributor and collection device comprising:
a cylindrical wall defining a central chamber, the cylindrical wall including a plurality of radially spaced openings disposed therein;
a plurality of connectors disposed on an exterior of the cylindrical wall, each connector is associated with a respective opening disposed in the cylindrical wall;
a plurality of at least one first elongated rigid conduit, the first elongated rigid conduit having a first opening at a first end thereof and a second opening at a second end thereof; and
at least one second elongated rigid conduit, the second elongated rigid conduit having a first opening at a first end thereof, a second opening at a second end thereof, and a plurality of slit openings for the entrance and exit of fluid into and out of said second elongated rigid conducts, said slit openings being disposed along at least a portion of a wall of the second elongated rigid conduit, wherein the first elongated rigid conduit is pivotally connected to a respective connector to move the first elongated rigid conduit from a loading position in which the first elongated rigid conduit extends in a downward direction away from the cylindrical wall to a fluid communication position in which a respective connector mates with the first elongated rigid conduit and the first elongated rigid conduit is in fluid communication with the respective connector, and wherein each of the second elongated rigid conduits is lockingly connected to a respective first elongated rigid conduit and is in fluid communication with the respective first elongated rigid conduit when the first elongated rigid conduit is in both the loading position and in the fluid communication position.

19. The fluid distributor and collection device as in claim 18 wherein the plurality of slit openings is in fluid communication with the respective second elongated rigid conduit.

* * * * *